US 9,947,012 B2

(12) United States Patent
Smith et al.

(10) Patent No.: US 9,947,012 B2
(45) Date of Patent: Apr. 17, 2018

(54) SECURE TRANSACTIONS USING A PERSONAL DEVICE

(71) Applicant: Intel Corporation, Santa Clara, CA (US)

(72) Inventors: Ned M. Smith, Beaverton, OR (US); William J. Lewis, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/367,986

(22) PCT Filed: Dec. 26, 2013

(86) PCT No.: PCT/US2013/077765
§ 371 (c)(1),
(2) Date: Jun. 23, 2014

(87) PCT Pub. No.: WO2015/099725
PCT Pub. Date: Jul. 2, 2015

(65) Prior Publication Data
US 2016/0314468 A1 Oct. 27, 2016

(51) Int. Cl.
*G06F 21/00* (2013.01)
*G06Q 20/40* (2012.01)
(Continued)

(52) U.S. Cl.
CPC ..... *G06Q 20/4012* (2013.01); *G06Q 20/1085* (2013.01); *G07F 7/1041* (2013.01)

(58) Field of Classification Search
CPC .. H04W 12/06; H04W 12/08; G06Q 20/4012; G06Q 20/1085; G06Q 20/325;
(Continued)

(56) References Cited

U.S. PATENT DOCUMENTS

| 5,768,386 A | 6/1998 | Yokomoto et al. |
| 2010/0024022 A1* | 1/2010 | Wells ................ H04L 63/0838 726/7 |

(Continued)

FOREIGN PATENT DOCUMENTS

| KR | 101308152 | * | 9/2013 |
| KR | 101308152 B1 | | 9/2013 |

(Continued)

OTHER PUBLICATIONS

"International Application Serial No. PCT/US2013/077765, International Preliminary Report on Patentability dated Jul. 7, 2016", 7 pgs.

(Continued)

*Primary Examiner* — Ghazal Shehni
(74) *Attorney, Agent, or Firm* — Schwegman Lundberg & Woessner, P.A.

(57) ABSTRACT

Various systems and methods for secure transactions using a personal device are described herein. A system to secure transactions using a personal device, the system comprises a randomization module to randomize an initial keypad representation to produce a randomized keypad representation; a communication module to: receive from the personal device, an indication to begin a secure transaction to access a resource with an access code; and transmit the randomized keypad representation to the personal device for presentation by the personal device to a user of the personal device; a keypad to receive a series of key presses from the user, the key presses corresponding to the access code based on the randomized keypad representation; and a security module to verify that the series of key presses correspond to the access code.

25 Claims, 5 Drawing Sheets

(51) Int. Cl.
*G07F 7/10* (2006.01)
*G06Q 20/10* (2012.01)

(58) Field of Classification Search
CPC .. G06Q 20/385; G06Q 20/401; G06Q 20/425; G06Q 20/04; G06Q 20/3829
See application file for complete search history.

(56) References Cited

U.S. PATENT DOCUMENTS

| | | |
|---|---|---|
| 2010/0124949 A1 | 5/2010 | Demuynck et al. |
| 2013/0169929 A1 | 7/2013 | Fateh |
| 2013/0325447 A1* | 12/2013 | Levien .................. G10L 15/30 704/201 |

FOREIGN PATENT DOCUMENTS

| | | |
|---|---|---|
| KR | 1020130107497 A | 10/2013 |
| WO | 2015099725 A1 | 7/2015 |

OTHER PUBLICATIONS

"International Application Serial No. PCT/US2013/077765, International Search Report dated Sep. 25, 2014", 3 pgs.
"International Application Serial No. PCT/US2013/077765, Written Opinion dated Sep. 25, 2014", 5 pgs.

\* cited by examiner

US 9,947,012 B2

SECURE TRANSACTIONS USING A PERSONAL DEVICE

This application is a U.S. National Stage Application under 35 U.S.C. 371 from International Application No. PCT/US2013/077765, filed on Dec. 26, 2013, which is hereby incorporated by reference in its entirety.

TECHNICAL FIELD

Embodiments described herein generally relate to security and in particular, to secure transactions using a personal device.

BACKGROUND

A personal identification number or "PIN" is a numeric code used for access control. PINs may be used in conjunction with a physical device, such as an access card. In the context of banking, an automated teller machine (ATM) may require an access card (e.g., bank card) and a PIN in order for the user to perform actions, such as deposit, withdraw, or transfer funds at a financial institution.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

An issue exists with many bank ATMs and other places where keypads are used. Because many of these types of devices are in public spaces, curious or malicious onlookers may have a vantage to view the user's fingers and obtain a PIN by watching the user key in their access code. This is known as an "over the shoulder" attack. This systems and methods disclosed herein include a system that may reduce or eliminate an "over the shoulder" security threat.

Wearable computing devices are becoming available. Such devices may provide advantages over smartphones and other mobile devices. One advantage is that some forms of wearable devices are nearly impossible to view for anyone but the person wearing the device. This is the situation with an eyeglasses-based device. In an eyeglasses-based device, the viewing surface is in close proximity to the user's eyes, and at an angle that may be un-viewable by onlookers. This physical arrangement provides an inherent security advantage to defeat or derail an "over the shoulder" threat.

Figure 1:
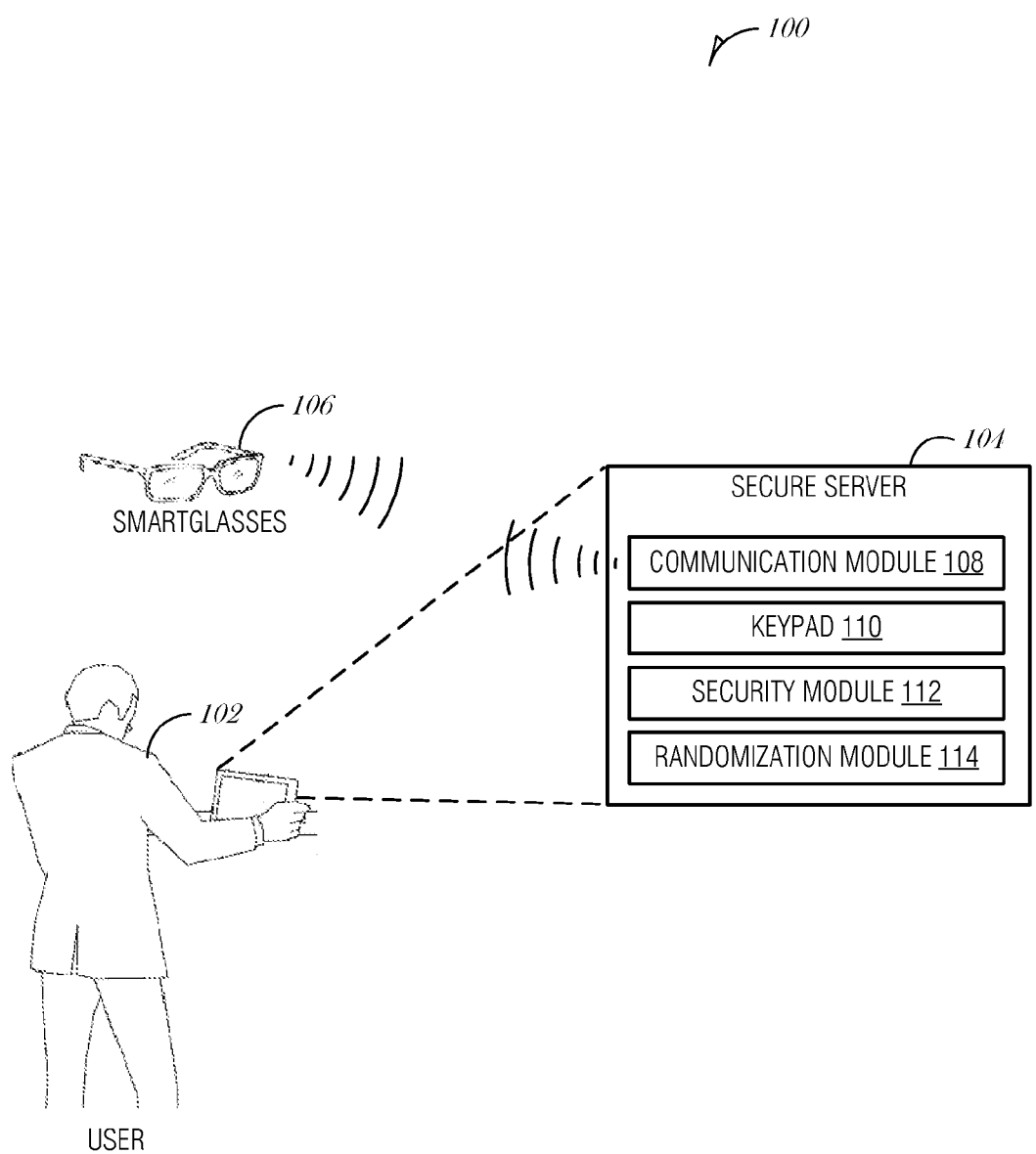
FIG. 1 is a schematic drawing illustrating a system to provide secure transactions using a personal device, according to an embodiment.

FIG. 1 is a schematic drawing illustrating a system 100 to provide secure transactions using a personal device, according to an embodiment. FIG. 1 includes a user 102 and a secure server 104. The user 102 may have one or more personal devices on his or her person, such as smartglasses 106. Personal devices include, but are not limited to smartglasses, smartwatches, smartphones, personal digital assistants, notepads, hybrids, tablets, or other wearable devices. Personal devices that are difficult to view by another person increase security.

The secure server 104 may include an automatic teller machine (ATM), a credit card reader (e.g., at a point of sale), a door lock mechanism, an alarm system, or any other type of device that uses a keypad for access control. A keypad is understood as being a set of buttons (either physical or virtual) arranged in a block or "pad" with each button usually bearing digits, symbols, or alphabetical letters. If a keypad contains solely numbers, then it may be referred to as a numeric keypad. A keypad may include control keys. For example, in the case of an ATM, control keys may be used to delete one entered character, clear all entered characters, cancel a transaction, or request help.

In the case of a door lock mechanism, the secure server 104 may be in a remote location, communicatively coupled to one or more door access control panels with keypads incorporated into the panel. The panel may be incorporated into the door lock (e.g., on or near the door handle) or mounted on a wall.

The smartglasses 106 may include a display for the user 102, such as a micro liquid crystal display (LCD) arranged near the corner of the temple and the glasses frame of the smartglasses 106. Alternatively, the smartglasses 106 may include a display that is projected on a lens or other surface in front of the user 104, such that the display may be used as a heads-up display (HUD). A HUD is useful because if it is configured to be translucent, the HUD allows the user to see the displayed material and the real objects behind it. Thus, the HUD provides for an augmented reality, where a user is viewing both the real world and a digital output simultaneously. The smartglasses 106 may also include a front-facing camera (e.g., away from the user 102) and a rear-facing camera (e.g., toward the user 102). The front-facing camera may be used to detect objects or other things in front of the user 102. The front-facing camera may be equipped to sense infrared light. The rear-facing camera may be used to detect eye movement, perform biometric authentication (e.g., via retinal scans), or other capabilities.

A user 102 wearing or holding a personal device (e.g., smartglasses 106) may approach a secure server 104, or an access point controlled by a secure server 104. The personal device and the secure server 104 may communicate with one another using various wireless technologies, such as near field communication (NFC), Bluetooth, 802.11, infrared, or the like. The user 102 may initiate a secure session with the secure server 104, such as by inserting an ATM card or by pressing a key on a keypad. The secure server 104 may generate a temporary randomized keypad configuration and transmit it to the personal device. In the case of smartglasses 106, the temporary randomized keypad configuration may be an overlay to present via a HUD over the physical keypad. The randomized keypad configuration is a remapped keypad with the keys randomly reassigned to different positions than would be conventionally found. The user 102 may then input their memorized PIN, but with the positions of the keys as represented in the reassigned keypad. Thus, for example, the user's PIN may be the sequence of numbers "1, 2, 3", which may typically represent the first row of buttons on a conventional keypad layout. But, after reassignment, the user 102 may press "1, 2, 3" based on the reassigned keypad that is overlaid on the physical keypad, but actually press the sequence "8, 4, 1" on the physical keypad. The secure server 104 receives the sequence of physical keypad actuations and then based on the reassigned keypad layout and the user's PIN from a backend server, the secure server 104 may validate that the user 102 input the correct PIN and grant access, dispense money, or otherwise authorize an activity.

In an embodiment, the secure server 104 includes system to secure transactions using a personal device. In an embodiment, the secure server 104 is an automated teller machine. In an embodiment, the secure server is a door lock system. In an embodiment, the personal device comprises a worn device. In a further embodiment, the worn device comprises an eyeglasses system. In a further embodiment, the worn device comprises a wristwatch system.

The secure server 104 may include a randomization module 114 to randomize an initial keypad representation to produce a randomized keypad representation.

The secure server 104 may include a communication module 108 to receive from the personal device, an indication to begin a secure transaction to access a resource with an access code. In an embodiment, to receive the indication to begin the secure transaction, the system is to receive an access card in a card reader of the secure server 104, the access card provided by the user of the personal device. In an embodiment, the access card comprises a bank card.

In another embodiment, to receive the indication to begin the secure transaction, the communication module 108 is to receive a request from an application operating on the personal device.

Then the communication module 108 may transmit the randomized keypad representation to the personal device for presentation by the personal device to a user of the personal device.

In an embodiment, to transmit the randomized keypad representation, the communication module 108 is to transmit locations of keys to the personal device to use when displaying the randomized keypad representation. For example, a matrix may be predetermined, such as m:n, where m refers to the row and n refers to the column. In this example, 1:1 would refer to row 1, column 1, and 1:2 would refer to row 1, column 2, etc. Thus, the secure server 104 may transmit a message with "1:1:9; 1:2:3; . . . " where the message is formatted as m:n:y, with m being the row, n being the column, and y being the numeral to display at the position m:n.

In an embodiment, to transmit the randomized keypad representation, the communication module 108 is to transmit an image to the personal device for presentation in a heads-up display. The image may be a compressed image, such as a JPEG (Joint Photographic Expert Group), GIF (Graphics Interchange Format), or PNG (Portable Network Graphics) file. The image may be displayed in a micro display of the smartglasses 104. Using the front-facing camera, the image may be stabilized, scaled, and oriented over the existing physical keypad. Thus, according to an embodiment, the presentation in the heads-up display is overlaid on the keypad of the secure server.

The secure server 104 may also include a keypad 110 to receive a series of key presses from the user 102, the key presses corresponding to the access code based on the randomized keypad representation. In an embodiment, the keypad 110 is a numeric keypad. In an embodiment, the keypad 110 is an alphanumeric keypad.

The secure server 104 may also include a security module 112 to verify that the series of key presses correspond to the access code. In an embodiment, to verify that the series of key presses correspond to the access code, the security module 112 is to map the randomized keypad representation to the initial keypad representation to obtain a cipher. The cipher may map the original key position to the remapped key position using a row and column coordinate system. The security module 112 may then obtain a mapped access code based on the series of key presses and decipher the mapped access code to obtain a deciphered access code. Using this information, the security module 112 may compare the deciphered access code to the access code. In an embodiment, the access code is a personal identification number.

In an embodiment, the communications module 108 receives the indication to begin the secure transaction and then transmits the randomized keypad representation to the personal device over a secure communications channel. In an embodiment, the secure communications channel comprises a communication channel between a trusted execution environment (TEE) of the secure server 104 and a trusted execution environment (TEE) of the personal device.

In an embodiment, the communication channel between the TEE of the system and the personal device is implemented with an enhanced privacy identifier (EPID). The TEE may be manufactured to include an EPID, which is an asymmetric private key that may be used to establish a secure channel to a TEE endpoint, but may not be used to track the specific personal device or the user 102.

In an embodiment, the security module 112 is to authenticate the user of the personal device before transmitting the randomized keypad representation. The secure server 104 may perform this as an added check to ensure that a live person is attempting to access the secure system, and also that the person attempting to access the secure system is a person that corresponds with the personal device. In an embodiment, to authenticate the user of the personal device, the security module 112 is to use a secure communications channel between the system and the personal device and receive an indication from the personal device that the user is recognized by the personal device. By allowing the personal device to authenticate the user 102, user biometrics and other identifying information may be kept safely at the user's personal device. In other embodiments, the secure server 104 may authenticate the user's identity with biometric sensors.

Figure 2:
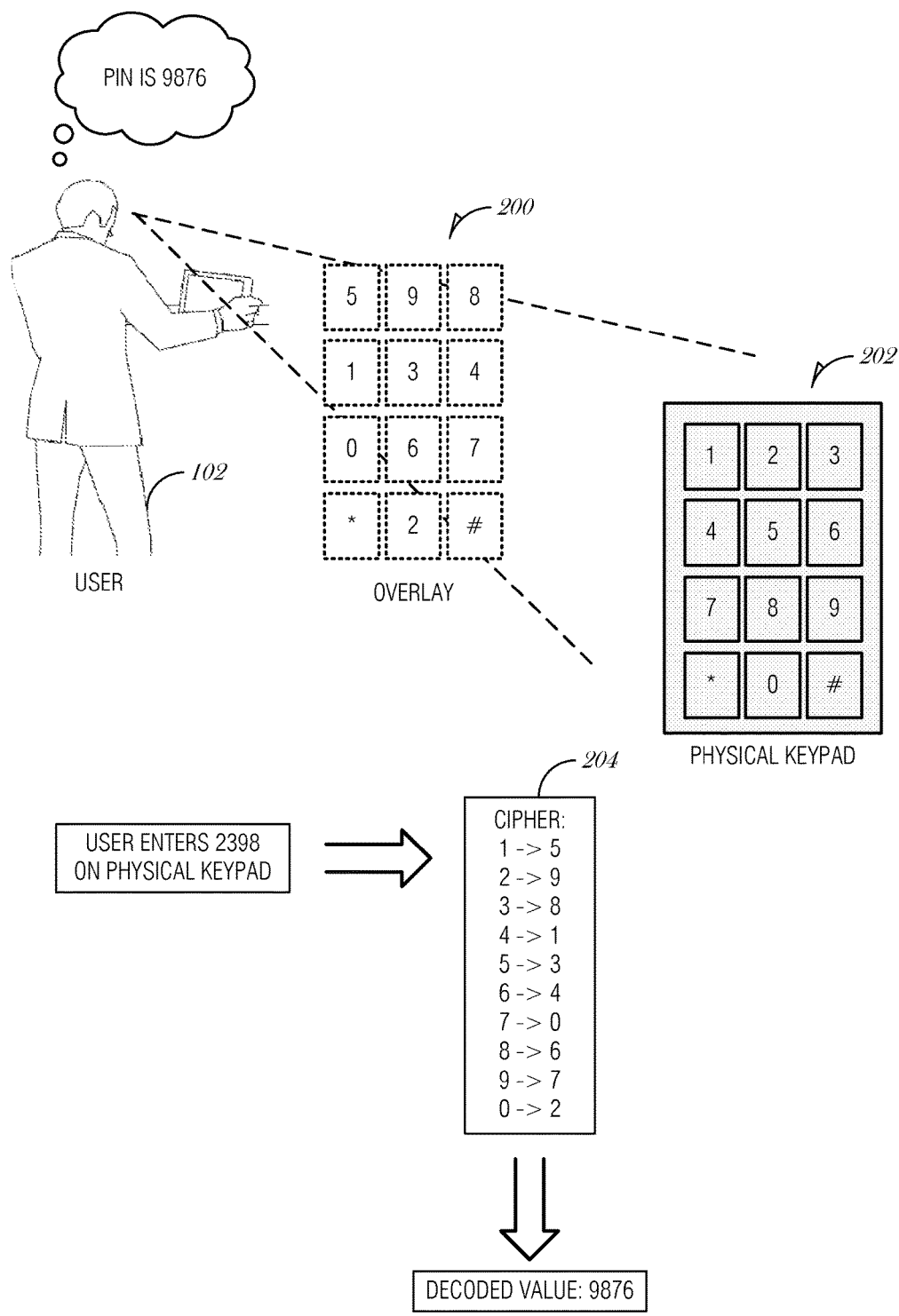
FIG. 2 is an illustration of using a personal device to access a secure resource, according to an embodiment.

FIG. 2 is an illustration of using a personal device to access a secure resource, according to an embodiment. In the scenario of FIG. 2, the personal device is a pair of smartglasses. The user 102 knows or is able to access a previously determined PIN. In the example shown in FIG. 2, the PIN is the value 9876. An overlay 200 is presented to the user 102 by the smartglasses. The overlay 200 may be presented approximately over a physical keypad 202. The overlay 200 may include some or all of the keys on the physical keypad 202 and may be in approximately the same configuration, spacing, and size as the physical keypad 202. The user 102, knowing the PIN, enters the PIN on the physical keypad 202, but using the key positions of the overlay 200. Thus, in this example, the physical keypad registers the keys '2', '3', '9', and '8' being pressed. A cipher 204 was created prior to the overlay 200 being presented. The cipher 204 maps original key values to the enciphered key values. To decipher or decode the actual input from the user 102, a system may use the cipher in reverse. Thus, the result of the physical keypad presses of '2', '3', '9', and '8', a decoded PIN number is identified as '9876' and the user 102 is provided access to the secure resource (e.g., door, bank account, computing resource, etc.).

Figure 3:
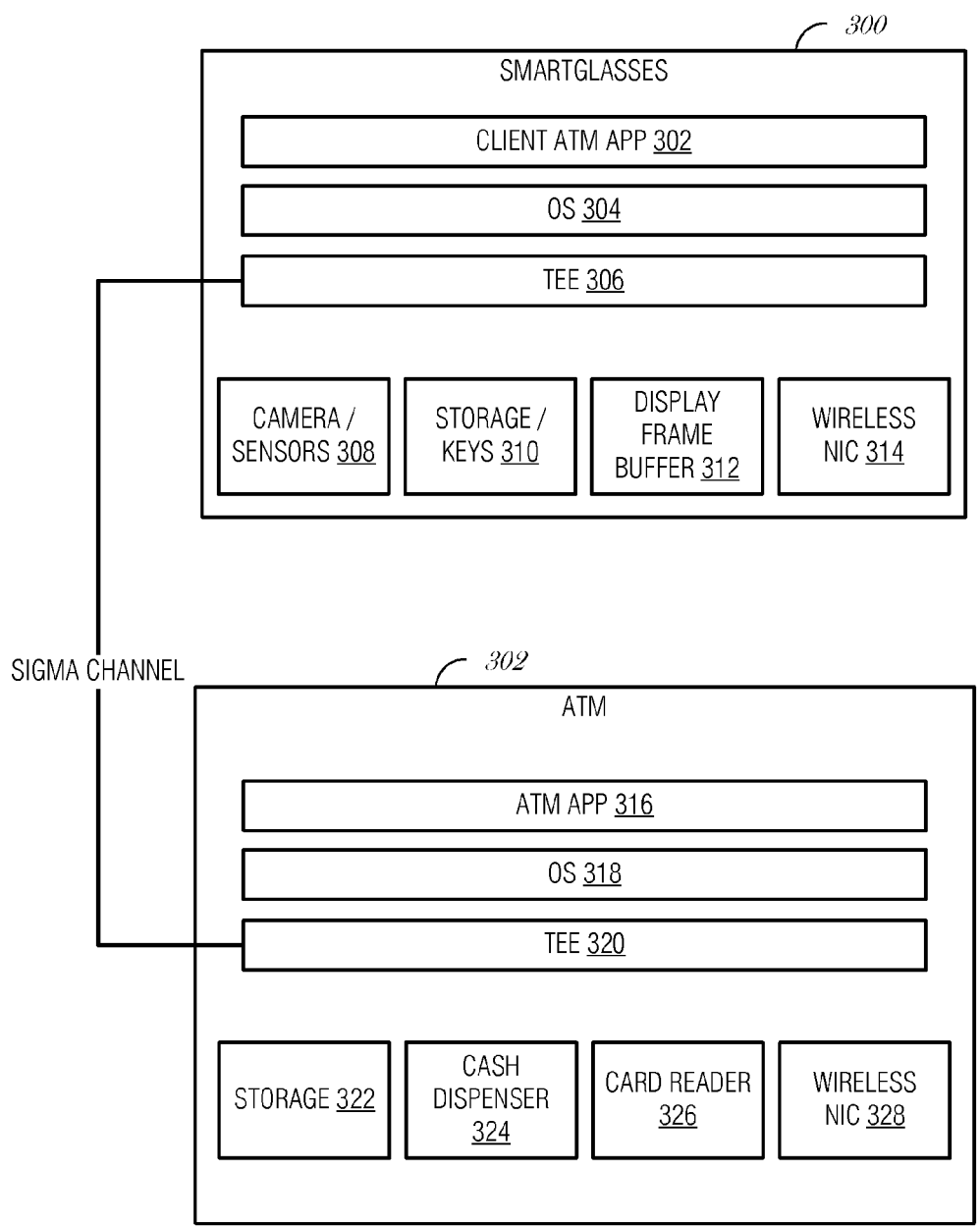
FIG. 3 is a block diagram of smartglasses and an ATM, according to an embodiment.

FIG. 3 is a block diagram of smartglasses 300 and an ATM 302, according to an embodiment. The smartglasses 300 include a client ATM app 302, an operation system (OS) 304, a trusted execution environment (TEE) 306, a camera/sensor array 308, a storage/key repository 310, a display frame buffer 312, and a wireless network interface card (NIC) 314. The client ATM app 302 may be used to interface at the application level with the ATM 302. The camera/sensor array 308 may include a front-facing camera and/or a rear-facing camera, biometric sensors (e.g., heart rate monitor), a microphone, and other sensors. In an embodiment, an ECG/EKG sensor may be part of the camera/sensor array 308 and placed in contact with the user's skin, such as at the nose bridge or near the ear on the temple of an eyeglasses-based device, or at the wrist in a wrist-based device. The ECG/EKG sensor may be used to authenticate the user by comparing the sensed heart rhythm with a previously obtained reference rhythm. The display frame buffer 312 is used to present images or video to the user of the smartglasses 300. The wireless NIC 314 may be used to communicate over one or more wireless protocols, such as Bluetooth, Wi-Fi, NFC, and the like.

The ATM 302 includes an ATM app 316, an OS 318, a TEE 320, a storage 322, a cash dispenser 324, a card reader 326, and a wireless NIC 328. The ATM app 316 may be used to run the user interface for the ATM 302, such as for financial transactions via a user input on a display screen. The card reader 326 may be used to receive and read a plastic access card, such as a bank card or a credit card. The cash dispenser 324 may be used to dispense currency, receipts, or other items.

The smartglasses 302 may be used as an extension of the ATM 302, which is a trusted device. Trust is achieved using Trusted Execution Environment (TEE) technology integrated into the smartglasses 302. The ATM 302 similarly implements a TEE component 306 so that a secure I/O channel may be constructed between the ATM 302 and the smartglasses 302. User's bank account information and PIN access challenge information may be safely exchanged over the secure I/O channel. Use of an Enhanced Privacy ID (EPID) technology in the smartglasses 300 ensures the user may maintain control of privacy by preventing the ATM 302 from tracking specific devices.

ATMs are often located in public areas creating the opportunity for socialization attacks such as over-the-shoulder observation and PIN scraping attacks targeting plastic card readers. By including the user personal device in the transaction, the nearness of the display to the user's eyes makes it physically difficult for observer attacks. Furthermore, it allows the ATM 302 to fool observers monitoring the ATM keypad device. PIN keypad devices serve two important functions: 1) it is a way for the user to authenticate to the ATM 302, and 2) it is a "liveness" test that ensures a real human being is making the transaction. Therefore, it is expected that ATMs will continue to require the combination two-factor user and PIN-pad interaction.

Returning to the example of FIG. 3, the smartglasses 300 rely on the TEE component 306 as the secure communications channel endpoint. This may be implemented using SIGMA (SIGn-and-MAc). SIGMA is a family of key-exchange protocols used to build authenticated Diffie-Hellman protocols using a combination of digital signatures and a MAC (message authentication) function.

The TEE 306 is manufactured to include an EPID, which is an asymmetric private key that may be used to establish a secure channel to the TEE endpoint but may not be used to track the specific device. The ATM 302 also may implement a TEE component 320 for added assurance on behalf of the user that account information is not being scraped by miscreant modifications to the card reader or other forms of attack on the ATM 302. The user trusts that the attacker is not able to successfully attack/modify the ATM TEE 320 and he is able to receive an attestation of the ATM TEE 320 image proving the ATM 302 is trustworthy according to a whitelist of known good ATM TEE kernels.

The personal device (e.g., smartglasses 300) may use additional sensors to authenticate the user locally and to perform different liveness tests locally. The results of these authentications and liveness tests may be communicated to the ATM 302 over the secure channel. However, in the interest of preservation of the user privacy, sensitive biometrics and contextual behavior may be withheld from the ATM 302.

Figure 4:
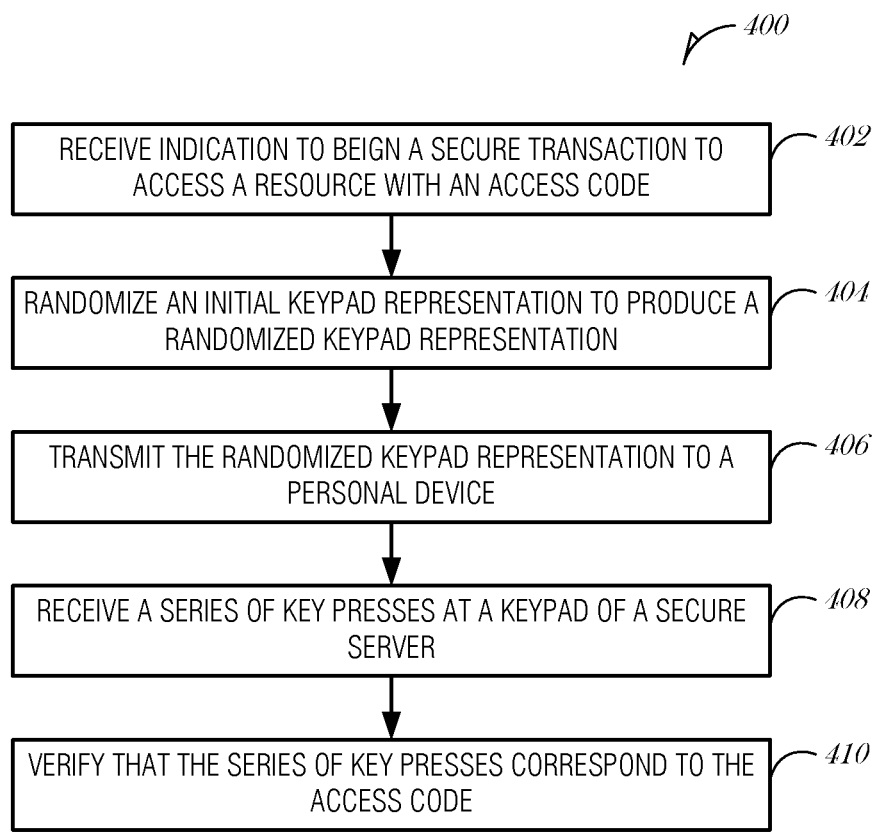
FIG. 4 is a flowchart illustrating a method for securing transactions using a personal device, according to an embodiment.

FIG. 4 is a flowchart illustrating a method 400 for securing transactions using a personal device, according to an embodiment. At 402, an indication to begin a secure transaction to access a resource with an access code is received at a secure server from a personal device. In an embodiment, the secure server is an automated teller machine. In an embodiment, the secure server is a door lock system. In an embodiment, the personal device comprises a worn device. In an embodiment, the worn device comprises an eyeglasses system. In an embodiment, the worn device comprises a wristwatch system.

In an embodiment, receiving the indication to begin the secure transaction comprises receiving an access card in a card reader of the secure server, the access card provided by the user of the personal device. In an embodiment, the access card comprises a bank card.

In an embodiment, receiving the indication to begin the secure transaction comprises receiving a request from an application operating on the personal device.

At 404, an initial keypad representation is randomized to produce a randomized keypad representation.

At 406, the randomized keypad representation is transmitted to the personal device for presentation by the personal device to a user of the personal device. In an embodiment, transmitting the randomized keypad representation comprises transmitting locations of keys to the personal device to use when displaying the randomized keypad representation.

In an embodiment, transmitting the randomized keypad representation comprises transmitting an image to the personal device for presentation in a heads-up display. In an embodiment, the presentation in the heads-up display is overlaid on the keypad of the secure server.

At 408, a series of key presses is received from the user at a keypad of the secure server, the key presses corresponding to the access code based on the randomized keypad representation. In an embodiment, the keypad of the secure server is a numeric keypad. In an embodiment, the keypad of the secure server is an alphanumeric keypad.

At 410, the series of key presses are verified that they correspond to the access code. In an embodiment, verifying that the series of key presses correspond to the access code comprises mapping the randomized keypad representation to the initial keypad representation to obtain a cipher, obtaining a mapped access code based on the series of key presses, deciphering the mapped access code to obtain a deciphered access code, comparing the deciphered access code to the access code. In an embodiment, the access code is a personal identification number.

In an embodiment, receiving the indication to begin the secure transaction and transmitting the randomized keypad representation to the personal device are conducted over a secure communications channel. In an embodiment, the secure communications channel comprises a communication channel between a trusted execution environment (TEE) of the secure server and a trusted execution environment (TEE) of the personal device. In an embodiment, the communication channel between the TEE of the secure server and the personal device is implemented with an enhanced privacy identifier.

In an embodiment, the method 300 includes authenticating the user of the personal device before transmitting the randomized keypad representation. In an embodiment, authenticating the user of the personal device comprises using a secure communications channel between the secure server and the personal device and receiving an indication from the personal device that the user is recognized by the personal device.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
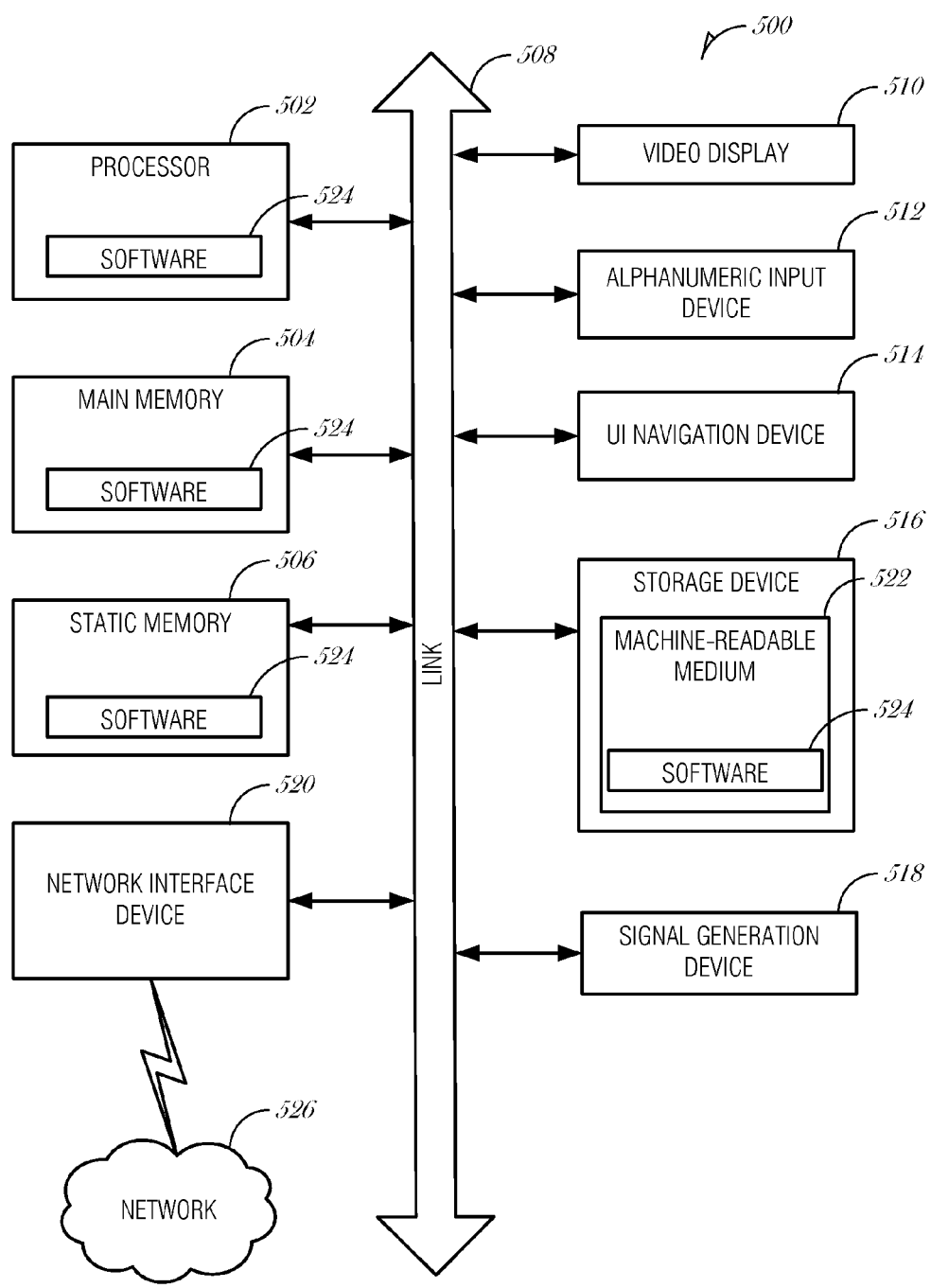
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 includes subject matter (such as a device, apparatus, or machine) comprising a system to secure transactions using a personal device, comprising a randomization module to randomize an initial keypad representation to produce a randomized keypad representation; a communication module to: receive from the personal device, an indication to begin a secure transaction to access a resource with an access code; and transmit the randomized keypad representation to the personal device for presentation by the personal device to a user of the personal device; a keypad to receive a series of key presses from the user, the key presses corresponding to the access code based on the randomized keypad representation; and a security module to verify that the series of key presses correspond to the access code.

In Example 2, the subject matter of Example 1 may optionally include, wherein the system is an automated teller machine.

In Example 3, the subject matter of any one or more of Examples 1 to 2 may optionally include, wherein the system is a door lock system.

In Example 4, the subject matter of any one or more of Examples 1 to 3 may optionally include, wherein the personal device comprises a worn device.

In Example 5, the subject matter of any one or more of Examples 1 to 4 may optionally include, wherein the worn device comprises an eyeglasses system.

In Example 6, the subject matter of any one or more of Examples 1 to 5 may optionally include, wherein the worn device comprises a wristwatch system.

In Example 7, the subject matter of any one or more of Examples 1 to 6 may optionally include, wherein to receive the indication to begin the secure transaction, the system is to receive an access card in a card reader of the system, the access card provided by the user of the personal device.

In Example 8, the subject matter of any one or more of Examples 1 to 7 may optionally include, wherein the access card comprises a bank card.

In Example 9, the subject matter of any one or more of Examples 1 to 8 may optionally include, wherein to receive the indication to begin the secure transaction, the communication module is to receive a request from an application operating on the personal device.

In Example 10, the subject matter of any one or more of Examples 1 to 9 may optionally include, wherein to transmit the randomized keypad representation, the communication module is to transmit locations of keys to the personal device to use when displaying the randomized keypad representation.

In Example 11, the subject matter of any one or more of Examples 1 to 10 may optionally include, wherein to transmit the randomized keypad representation, the communication module is to transmit an image to the personal device for presentation in a heads-up display.

In Example 12, the subject matter of any one or more of Examples 1 to 11 may optionally include, wherein the presentation in the heads-up display is overlaid on the keypad of the system.

In Example 13, the subject matter of any one or more of Examples 1 to 12 may optionally include, wherein the keypad is a numeric keypad.

In Example 14, the subject matter of any one or more of Examples 1 to 13 may optionally include, wherein the keypad is an alphanumeric keypad.

In Example 15, the subject matter of any one or more of Examples 1 to 14 may optionally include, wherein to verify that the series of key presses correspond to the access code, the security module is to: map the randomized keypad representation to the initial keypad representation to obtain a cipher; obtain a mapped access code based on the series of key presses; decipher the mapped access code to obtain a deciphered access code; and compare the deciphered access code to the access code.

In Example 16, the subject matter of any one or more of Examples 1 to 15 may optionally include, wherein the access code is a personal identification number.

In Example 17, the subject matter of any one or more of Examples 1 to 16 may optionally include, wherein the communications module receives the indication to begin the secure transaction and then transmits the randomized keypad representation to the personal device over a secure communications channel.

In Example 18, the subject matter of any one or more of Examples 1 to 17 may optionally include, wherein the secure communications channel comprises a communication channel between a trusted execution environment (TEE) of the system and a trusted execution environment (TEE) of the personal device.

In Example 19, the subject matter of any one or more of Examples 1 to 18 may optionally include, wherein the communication channel between the TEE of the system and the personal device is implemented with an enhanced privacy identifier.

In Example 20, the subject matter of any one or more of Examples 1 to 19 may optionally include, wherein the security module is to authenticate the user of the personal device before transmitting the randomized keypad representation.

In Example 21, the subject matter of any one or more of Examples 1 to 20 may optionally include, wherein to authenticate the user of the personal device, the security module is to: use a secure communications channel between the system and the personal device; and receive an indication from the personal device that the user is recognized by the personal device.

Example 22 includes subject matter for secure transactions using a personal device (such as a method, means for performing acts, machine readable medium including instructions that when performed by a machine cause the machine to performs acts, or an apparatus configured to perform) comprising: receiving at a secure server from the personal device, an indication to begin a secure transaction to access a resource with an access code; randomizing an initial keypad representation to produce a randomized keypad representation; transmitting the randomized keypad representation to the personal device for presentation by the personal device to a user of the personal device; receiving a series of key presses from the user at a keypad of the secure server, the key presses corresponding to the access code based on the randomized keypad representation; and verifying that the series of key presses correspond to the access code.

In Example 23, the subject matter of Example 22 may optionally include, wherein the secure server is an automated teller machine.

In Example 24, the subject matter of any one or more of Examples 22 to 23 may optionally include, wherein the secure server is a door lock system.

In Example 25, the subject matter of any one or more of Examples 22 to 24 may optionally include, wherein the personal device comprises a worn device.

In Example 26, the subject matter of any one or more of Examples 22 to 25 may optionally include, wherein the worn device comprises an eyeglasses system.

In Example 27, the subject matter of any one or more of Examples 22 to 26 may optionally include, wherein the worn device comprises a wristwatch system.

In Example 28, the subject matter of any one or more of Examples 22 to 27 may optionally include, wherein receiving the indication to begin the secure transaction comprises receiving an access card in a card reader of the secure server, the access card provided by the user of the personal device.

In Example 29, the subject matter of any one or more of Examples 22 to 28 may optionally include, wherein the access card comprises a bank card.

In Example 30, the subject matter of any one or more of Examples 22 to 29 may optionally include, wherein receiving the indication to begin the secure transaction comprises receiving a request from an application operating on the personal device.

In Example 31, the subject matter of any one or more of Examples 22 to 30 may optionally include, wherein transmitting the randomized keypad representation comprises transmitting locations of keys to the personal device to use when displaying the randomized keypad representation.

In Example 32, the subject matter of any one or more of Examples 22 to 31 may optionally include, wherein transmitting the randomized keypad representation comprises transmitting an image to the personal device for presentation in a heads-up display.

In Example 33, the subject matter of any one or more of Examples 22 to 32 may optionally include, wherein the presentation in the heads-up display is overlaid on the keypad of the secure server.

In Example 34, the subject matter of any one or more of Examples 22 to 33 may optionally include, wherein the keypad of the secure server is a numeric keypad.

In Example 35, the subject matter of any one or more of Examples 22 to 34 may optionally include, wherein the keypad of the secure server is an alphanumeric keypad.

In Example 36, the subject matter of any one or more of Examples 22 to 35 may optionally include, wherein verifying that the series of key presses correspond to the access code comprises: mapping the randomized keypad representation to the initial keypad representation to obtain a cipher; obtaining a mapped access code based on the series of key presses; deciphering the mapped access code to obtain a deciphered access code; and comparing the deciphered access code to the access code.

In Example 37, the subject matter of any one or more of Examples 22 to 36 may optionally include, wherein the access code is a personal identification number.

In Example 38, the subject matter of any one or more of Examples 22 to 37 may optionally include, wherein the receiving the indication to begin the secure transaction and then transmitting the randomized keypad representation to the personal device are conducted over a secure communications channel.

In Example 39, the subject matter of any one or more of Examples 22 to 38 may optionally include, wherein the secure communications channel comprises a communication channel between a trusted execution environment (TEE) of the secure server and a trusted execution environment (TEE) of the personal device.

In Example 40, the subject matter of any one or more of Examples 22 to 39 may optionally include, wherein the communication channel between the TEE of the secure server and the personal device is implemented with an enhanced privacy identifier.

In Example 41, the subject matter of any one or more of Examples 22 to 40 may optionally include, authenticating the user of the personal device before transmitting the randomized keypad representation.

In Example 42, the subject matter of any one or more of Examples 22 to 41 may optionally include, wherein authenticating the user of the personal device comprises: using a secure communications channel between the secure server and the personal device; and receiving an indication from the personal device that the user is recognized by the personal device.

Example 43 includes a machine-readable medium including instructions for secure transactions using a personal device, which when executed by a machine, cause the machine to perform operations of any of the Examples 1-42.

Example 44 includes an apparatus comprising means for performing any of the Examples 1-42.

Example 45 includes an apparatus comprising means for receiving at a secure server from the personal device, an indication to begin a secure transaction to access a resource with an access code; means for randomizing an initial keypad representation to produce a randomized keypad representation; means for transmitting the randomized keypad representation to the personal device for presentation by the personal device to a user of the personal device; means for receiving a series of key presses from the user at a keypad of the secure server, the key presses corresponding to the access code based on the randomized keypad representation; and means for verifying that the series of key presses correspond to the access code.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A non-transitory machine-readable medium including instructions for secure transactions using a personal device, which when executed by a machine, cause the machine to perform the operations including:
   receiving at a secure server from the personal device, an indication to begin a secure transaction to access a resource with an access code;
   randomizing an initial keypad representation of a physical keypad of the secure server to produce a randomized keypad representation;
   transmitting the randomized keypad representation to the personal device for presentation by the personal device to a user of the personal device, the randomized keypad representation presented as augmented reality content with respect to the physical keypad;
   receiving a series of key presses from the user at the physical keypad of the secure server, the physical keypad of the secure server being separate from personal device, the key presses actuating keys of the physical keypad, the key presses corresponding to the access code as presented on the randomized keypad representation displayed on the personal device, and the keys pressed on the physical keypad being pressed in a different sequence than the access code; and
   verifying that the series of key presses correspond to the access code.

2. The non-transitory machine-readable medium of claim 1, wherein the secure server is an automated teller machine.

3. The non-transitory machine-readable medium of claim 1, wherein the personal device comprises a worn device.

4. The non-transitory machine-readable medium of claim 3, wherein the worn device comprises an eyeglasses system.

5. The non-transitory machine-readable medium of claim 1, wherein receiving the indication to begin the secure transaction comprises receiving an access card in a card reader of the secure server, the access card provided by the user of the personal device.

6. The non-transitory machine-readable medium of claim 1, wherein receiving the indication to begin the secure transaction comprises receiving a request from an application operating on the personal device.

7. The non-transitory machine-readable medium of claim 1, wherein transmitting the randomized keypad representation comprises transmitting locations of keys to the personal device to use when displaying the randomized keypad representation.

8. The non-transitory machine-readable medium of claim 1, wherein transmitting the randomized keypad representation comprises transmitting an image to the personal device for presentation in a heads-up display.

9. The non-transitory machine-readable medium of claim 8, wherein the presentation in the heads-up display is overlaid on the physical keypad of the secure server.

10. The non-transitory machine-readable medium of claim 1, wherein verifying that the series of key presses correspond to the access code comprises:
    mapping the randomized keypad representation to the initial keypad representation to obtain a cipher;
    obtaining a mapped access code based on the series of key presses;
    deciphering the mapped access code to obtain a deciphered access code; and
    comparing the deciphered access code to the access code.

11. The non-transitory machine-readable medium of claim 1, wherein the access code is a personal identification number.

12. The non-transitory machine-readable medium of claim 1, wherein the receiving the indication to begin the secure transaction and then transmitting the randomized keypad representation to the personal device are conducted over a secure communications channel.

13. The non-transitory machine-readable medium of claim 12, wherein the secure communications channel comprises a communication channel between a trusted execution environment (TEE) of the secure server and a trusted execution environment (TEE) of the personal device.

14. The non-transitory machine-readable medium of claim 13, wherein the communication channel between the TEE of the secure server and the personal device is implemented with an enhanced privacy identifier.

15. The non-transitory machine-readable medium of claim 1, further comprising authenticating the user of the personal device before transmitting the randomized keypad representation.

16. The non-transitory machine-readable medium of claim 15, wherein authenticating the user of the personal device comprises:
   using a secure communications channel between the secure server and the personal device; and
   receiving an indication m the personal device that the user is recognized by the personal device.

17. A system to secure transactions using a personal e, tare system comprising:
   a randomization circuit to randomize a keypad representation of a physical keypad to produce a randomized keypad representation;
   a communication circuit to:
      receive from the personal device, an indication to begin a secure transaction to access a resource with an access code; and
      transmit the randomized keypad representation to the personal device presentation by the personal device to a user of the personal device, the randomized keypad representation presented as augmented reality content with respect to a physical keypad;
   the physical keypad to receive a series of key presses from the user, the key presses actuating keys of the physical keypad, the key presses corresponding to the access code as presented on the randomized keypad representation displayed on the personal device, and the keys pressed on the physical keypad being pressed in a different sequence than the access code; and
   a security circuit to verify that the series of key presses correspond to the access code.

18. The system of claim 17, wherein to verify that the series of key presses correspond to the access code, the security circuit is to:
   map the randomized keypad representation to the initial keypad representation to obtain a cipher;
   obtain a mapped access code based on the series of key presses;
   decipher the mapped access code to obtain a deciphered access code; and
   compare the deciphered access code to the access code.

19. A method for secure transactions using a personal device, the method comprising:
   receiving at a secure server from the personal device, an indication to begin a secure transaction to access a resource with an access code;
   randomizing an initial keypad representation of a physical pa of the secure server to produce a randomized keypad representation;
   transmitting the randomized keypad representation to the personal device for presentation by the personal device to a user of the personal device, the randomized keypad representation presented as augmented reality content with respect to the physical keypad;
   receiving a series of key presses from the user at the physical keypad of the secure server, the physical keypad of the secure server being separate from personal device, the key presses actuating keys of the physical keypad, the key presses corresponding to the access code as presented on the randomized keypad representation displayed on the personal device, and the keys pressed on the physical keypad being pressed in a different sequence than the access code; and
   verifying that the series of key presses correspond to the access code.

20. The method of claim 19, further comprising authenticating the user of the personal device before transmitting the randomized keypad representation.

21. The method of claim 19, wherein verifying that the series of key presses correspond to the access code comprises:
   mapping the randomized keypad representation tote initial keypad representation to obtain a cipher;
   obtaining a mapped access code based on the series of key presses;
   deciphering the mapped access code to obtain a deciphered access code; and
   comparing the deciphered access code to the access code.

22. The method of claim 19, wherein the access code is a personal identification number.

23. The method of claim 19, wherein the receiving the indication to begin the secure transaction and then transmitting the randomized keypad representation to the personal device are conducted over a secure communications channel.

24. The method of claim 23, wherein the secure communications channel comprises a communication channel between a trusted execution environment (TEE) of the secure server and a trusted execution environment (TEE) of the personal device.

25. The method of claim 24, wherein the communication channel between the TEE of the secure server and the personal device is implemented with an enhanced privacy identifier.

* * * * *

UNITED STATES PATENT AND TRADEMARK OFFICE
CERTIFICATE OF CORRECTION

PATENT NO. : 9,947,012 B2
APPLICATION NO. : 14/367986
DATED : April 17, 2018
INVENTOR(S) : Smith et al.

Page 1 of 1

It is certified that error appears in the above-identified patent and that said Letters Patent is hereby corrected as shown below:

In the Claims

Column 15, Line 12, Claim 16, delete "m" and insert --from-- therefor

Column 15, Line 14, Claim 17, delete "e, tare" and insert --device, the-- therefor Column 15, Line 16, Claim 17, delete "a keypad" and insert --an initial keypad-- therefor Column 15, Line 24, Claim 17, after "device", insert --for--

Column 16, Line 2, Claim 19, delete "pa" and insert --keypad-- therefor

Column 16, Line 27, Claim 21, delete "tote" and insert --to the-- therefor

Signed and Sealed this
Fourth Day of June, 2019

Andrei Iancu
*Director of the United States Patent and Trademark Office*